United States Patent
Duan et al.

(10) Patent No.: US 12,407,236 B2
(45) Date of Patent: Sep. 2, 2025

(54) MOTOR, CAMERA MODULE, AND MOBILE TERMINAL

(71) Applicant: Huawei Technologies Co., Ltd., Shenzhen (CN)

(72) Inventors: Ran Duan, Shenzhen (CN); Yingyong He, Dongguan (CN); Haibo Wan, Dongguan (CN); Dengfeng Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 256 days.

(21) Appl. No.: 17/772,735

(22) PCT Filed: Oct. 15, 2020

(86) PCT No.: PCT/CN2020/121301
§ 371 (c)(1),
(2) Date: Apr. 28, 2022

(87) PCT Pub. No.: WO2021/082944
PCT Pub. Date: May 6, 2021

(65) Prior Publication Data
US 2022/0345021 A1     Oct. 27, 2022

(30) Foreign Application Priority Data
Oct. 28, 2019    (CN) .......................... 201911032725.8

(51) Int. Cl.
*H02K 41/035*       (2006.01)
*G03B 5/00*         (2021.01)
(Continued)

(52) U.S. Cl.
CPC .......... *H02K 41/0356* (2013.01); *G03B 5/00* (2013.01); *G03B 13/36* (2013.01); *H04N 23/687* (2023.01); *G03B 2205/0076* (2013.01)

(58) Field of Classification Search
CPC .... H02K 41/0356; H04N 23/687; G03B 5/00; G03B 13/36; G03B 2205/0076;
(Continued)

(56) References Cited

U.S. PATENT DOCUMENTS

2010/0074607 A1   3/2010   Topliss et al.
2010/0265343 A1   10/2010  Lee et al.
(Continued)

FOREIGN PATENT DOCUMENTS

CN    102081214 A    6/2011
CN    102150073 A    8/2011
(Continued)

OTHER PUBLICATIONS

CN107979259A English translation (Year: 2024).*

*Primary Examiner* — Christopher M Koehler
*Assistant Examiner* — Viswanathan Subramanian
(74) *Attorney, Agent, or Firm* — Conley Rose, P.C.

(57) ABSTRACT

A system includes a motor, a camera module, and a mobile terminal. The motor includes a base, a support base, and a shape memory alloy actuator. The shape memory alloy actuator is connected between the base and the support base, and the shape memory alloy actuator is configured to drive the support base to move relative to the base.

20 Claims, 17 Drawing Sheets

(51) Int. Cl.
*G03B 13/36* (2021.01)
*H04N 23/68* (2023.01)

(58) Field of Classification Search
CPC .. G03B 2205/0007; G03B 3/00; G03B 30/00; G02B 7/09; G02B 27/646; F03G 7/06143; F03G 7/0665
See application file for complete search history.

(56) References Cited

U.S. PATENT DOCUMENTS

| | | |
|---|---|---|
| 2010/0275592 A1 | 11/2010 | Topliss et al. |
| 2011/0091193 A1* | 4/2011 | Lim .................... G02B 7/023 |
| | | 396/133 |
| 2011/0128641 A1 | 6/2011 | Ouchi |
| 2011/0249131 A1 | 10/2011 | Topliss et al. |
| 2011/0267692 A1 | 11/2011 | Wantanabe et al. |
| 2014/0009675 A1 | 1/2014 | Chiu |
| 2015/0135703 A1 | 5/2015 | Eddington et al. |
| 2016/0161756 A1 | 6/2016 | Liu et al. |
| 2020/0192187 A1 | 6/2020 | Lee |

FOREIGN PATENT DOCUMENTS

| | | |
|---|---|---|
| CN | 102282510 A | 12/2011 |
| CN | 101867722 B | 2/2015 |
| CN | 104335101 A | 2/2015 |
| CN | 204462604 U | 7/2015 |
| CN | 106787600 A | 5/2017 |
| CN | 107979259 A | 5/2018 |
| CN | 109856891 A | 6/2019 |
| TW | 201403204 A | 1/2014 |
| WO | 2017069491 A1 | 4/2017 |
| WO | 2017191998 A1 | 11/2017 |
| WO | 2018234573 A1 | 12/2018 |
| WO | 2019004643 A1 | 1/2019 |
| WO | 2019034860 A1 | 2/2019 |

* cited by examiner

MOTOR, CAMERA MODULE, AND MOBILE TERMINAL

CROSS-REFERENCE TO RELATED APPLICATIONS

This is a U.S. National Stage of International Patent Application No. PCT/CN2020/121301 filed on Oct. 15, 2020, which claims priority to Chinese Patent Application No. 201911032725.8 filed on Oct. 28, 2019. Both of the aforementioned applications are hereby incorporated by reference in their entireties.

This application claims priority to Chinese Patent Application No. 201911032725.8, filed with the China National Intellectual Property Administration on Oct. 28, 2019 and entitled "MOTOR, CAMERA MODULE, AND MOBILE TERMINAL", which is incorporated herein by reference in its entirety.

TECHNICAL FIELD

This application relates to the field of camera technologies, and in particular, to a motor, a camera module, and a mobile terminal.

BACKGROUND

Mobile terminals having a camera function, such as smartphones and tablet computers, have increasingly high requirements for driving devices used therein, which are very important especially to autofocus (Auto Focus, AF for short) and optical image stabilization (Optical Image Stabilization, OIS for short) functions.

Therefore, optical image stabilizers (OIS) are often employed in high-quality image camera lenses to prevent image damage caused by hand shaking during photography. Drivers used in conventional OIS apparatuses include a voice coil motor (Voice Coil Motor, VCM for short) type OIS apparatus, a shape memory alloy (Shape memory alloy, shape memory alloy for short) type OIS apparatus, a VCM-shape memory alloy type OIS apparatus, a piezoelectric type OIS apparatus, or a stepper motor type OIS apparatus.

In addition, there is a shape memory alloy motor, such as an eight-wire motor, which removes driving methods of other types such as electromagnetic and piezoelectric, and relies only on shape memory alloy wires to achieve AF and OIS functions. Such a motor has advantages such as low costs, large thrust, long stroke, and no electromagnetic interference, and has wide application prospects. A rotor is suspended in the motor only by the shape memory alloy wires. When the shape memory alloy motor is powered on, the shape memory alloy wires are controlled to be energized to contract, and the position and posture of the motor rotor are changed. When the shape memory alloy motor is powered off, the shape memory alloy wires get loose due to power outage, and the position and posture of the motor rotor are relatively free and may vary with the direction of gravity, resulting in a relatively large deviation between the center of the motor rotor and the central position of a motor stator. As shown in FIG. 1, there is a relatively large deviation, namely eccentricity, between a central axis A1 of a rotor 10a and a central axis A2 of a stator 20a, which affects the appearance of a camera module and a mobile terminal, and affects a product yield.

SUMMARY

Embodiments of this application provide a motor, a camera module, and a mobile terminal, to resolve a technical problem of reducing eccentricity.

To achieve the foregoing objective, implementations of this application use the following technical solutions.

According to a first aspect, an embodiment of this application provides a motor, including a base, a support base, and a shape memory alloy actuator. The support base and the base are disposed in a stacked manner. The shape memory alloy actuator is fixedly connected between the base and the support base, and the shape memory alloy actuator is configured to drive the support base to move relative to the base. The motor further includes an eccentricity-prevention magnetic assembly, the eccentricity-prevention magnetic assembly includes a first eccentricity-prevention member and a second eccentricity-prevention member, the first eccentricity-prevention member is disposed on the base, the second eccentricity-prevention member is disposed on the support base, and when the motor is in a powered-off state, a first central axis of the base coincides with a second central axis of the support base under the action of magnetostatic forces between the first eccentricity-prevention member and the second eccentricity-prevention member.

The shape memory alloy actuator can contract and deform when energized, so as to provide a driving force for the support base to move relative to the base. In the powered-off state, none of the shape memory alloy actuators are supplied with power. In other words, the shape memory alloy actuators cannot provide a driving force for the support base to move relative to the base.

When the motor is in a powered-off state, due to the action of the magnetostatic forces between the first eccentricity-prevention member and the second eccentricity-prevention member, the first central axis of the base coincides with the second central axis of the support base, so that a possibility of the problem of eccentricity of the motor is reduced, and a product yield is improved.

The first eccentricity-prevention member and the second eccentricity-prevention member have magnetostatic forces of attraction or repulsion therebetween. One of the first eccentricity-prevention member and the second eccentricity-prevention member is a magnet, and the other is a magnetizer; or both the first eccentricity-prevention member and the second eccentricity-prevention member are magnets. With the magnetostatic forces between the first eccentricity-prevention member and the second eccentricity-prevention member, the first central axis of the base coincides with the second central axis of the support base, and the eccentricity-prevention magnetic assembly has a simple structure. In this way, the motor has the function of preventing eccentricity while keeping the structure simple.

In an implementation, the base has a first limiting portion, the first limiting portion is provided with a limiting groove, the support base has a second limiting portion, and the second limiting portion is accommodated in the limiting groove of the first limiting portion, so as to limit the movement of the support base relative to the base.

In an implementation, the base further includes a baseplate, the first limiting portion protrudes from the baseplate, the baseplate is provided with a first accommodating hole corresponding to the second limiting portion, the first eccentricity-prevention member is accommodated in the first accommodating hole, the second eccentricity-prevention member is disposed on the second limiting portion, the first eccentricity-prevention member and the second eccentricity-prevention member have magnetostatic forces of attraction therebetween, and when the motor is in a powered-off state, a side of the second limiting portion facing the baseplate fits together with the baseplate. The first eccentricity-prevention member is built in the baseplate and not exposed from the base, so that the first eccentricity-prevention member is protected, and the movement of the support base relative to the base and the wiring of the motor are not affected.

In an implementation, the baseplate is provided with a guide groove communicating with the limiting groove, the bottom of the second limiting portion adjacent to the baseplate is provided with a guide protrusion, and the guide protrusion is accommodated in the guide groove when the motor is in a powered-off state. When the motor is in a powered-off state, under the action of the magnetostatic forces between the first eccentricity-prevention member and the second eccentricity-prevention member, the guide protrusion is accommodated in the guide groove, the first central axis of the base substantially coincides with the second central axis of the support base, the support base is centered on the base, and the guide groove guides the movement of the support base relative to the base, thereby improving the accuracy of centering the motor.

In an implementation, the base further includes a baseplate, the first limiting portion protrudes from the baseplate, the limiting groove extends through the baseplate, an end face of the first limiting portion away from the baseplate is provided with a first accommodating hole, and the first eccentricity-prevention member is accommodated in the first accommodating hole; the second eccentricity-prevention member is disposed on the second limiting portion, and when the motor is in a powered-off state, due to the action of the magnetostatic forces between the first eccentricity-prevention member and the second eccentricity-prevention member, part of an outer side wall of the first limiting portion fits together with a side wall of the limiting groove.

The first eccentricity-prevention member is accommodated in the first accommodating hole, so that the first eccentricity-prevention member is protected, and the assembly of the motor is facilitated. The first eccentricity-prevention member is built in the baseplate and not exposed from the base, so that the movement of the support base relative to the base and the wiring of the motor are not affected.

In an implementation, the second limiting portion is provided with a second accommodating hole, and the second eccentricity-prevention member is accommodated in the second accommodating hole. In this way, the second eccentricity-prevention member is built in the support base and not exposed from the support base, so that the second eccentricity-prevention member is protected, and the movement of the support base relative to the base is not affected.

In an implementation, the motor further includes an eccentricity-prevention elastic structure fixedly connected between the support base and the base, the eccentricity-prevention elastic structure is configured to provide an elastic force for the base and the support base, so as to assist the eccentricity-prevention magnetic assembly in making the first central axis of the base coincide with the second central axis of the support base, or assist the shape memory alloy actuator in driving the support base to move relative to the base, to implement image stabilization and focusing.

In an implementation, the support base further includes a connecting portion spaced apart from the second limiting portion, the shape memory alloy actuator is fixedly connected between the first limiting portion and the connecting portion, the eccentricity-prevention elastic structure is fixedly connected between the connecting portion and the first limiting portion, the connecting portion is provided with an abutting bump, the eccentricity-prevention elastic structure is provided with a slot, and the abutting protrusion is accommodated in the slot, which is beneficial to the improvement of connection stability between the eccentricity-prevention elastic structure and the support base.

In an implementation, the eccentricity-prevention elastic structure includes a first elastic member and a second elastic member, each of the first elastic member and the second elastic member is fixedly connected between the base and the support base, and the first elastic member and the second elastic member are spaced apart along the first central axis of the base, so as to strengthen the elastic force of the eccentricity-prevention elastic structure.

In an implementation, the eccentricity-prevention elastic structure is electrically connected to the shape memory alloy actuator as a common ground of the motor. The eccentricity-prevention elastic structure acts as an electrical connection while providing an elastic force for the support base, which is beneficial to simplification of the structure and wiring of the motor.

In an implementation, the motor includes a plurality of side portions, the first limiting portion includes two secondary mounting portions that are fixedly connected, and each secondary mounting portion is protruded with two first fastening terminals; the connecting portion includes two secondary connecting portions that are fixedly connected, and each secondary connecting portion is provided with a second fastening terminal; and each side portion of the motor is correspondingly provided with two shape memory alloy actuators that are disposed crosswise, and each shape memory alloy is fastened between the first fastening terminal of one secondary mounting portion and the second fastening terminal of one secondary connecting portion.

In an implementation, the eccentricity-prevention elastic structure is fastened to an end face of the connecting portion away from the baseplate and an end face of the first limiting portion away from the baseplate.

According to a second aspect, an embodiment of this application further provides a camera module, including a lens and the motor described above, where the lens is fastened onto the support base.

When the motor is in a powered-off state, due to the action of a magnetic force of the eccentricity-prevention magnetic assembly, a first central axis of the base coincides with a second central axis of the support base, so that a possibility of the problem of eccentricity of the motor is reduced, and a yield of the camera module is improved.

According to a third aspect, an embodiment of this application further provides a mobile terminal, including the camera module described above and a processor. The processor is configured to control to supply power to the shape memory alloy actuator, to drive the support base with the lens to move relative to the base for autofocus and image stabilization.

When the motor is in a powered-off state, due to the action of a magnetic force of the eccentricity-prevention magnetic assembly, a first central axis of the base coincides with a second central axis of the support base, so that a possibility of the problem of eccentricity of the motor is reduced, and a yield of the mobile terminal is improved.

In an implementation, the processor is configured to control the magnitude of a current that is input to each shape memory alloy actuator, thereby driving the support base to move relative to the base.

In an implementation, the processor is configured to control, for each shape memory alloy actuator, a voltage based on a duty cycle of pulse width modulation, thereby driving the support base to move relative to the base.

In an implementation, the mobile terminal is one of a smartphone, a smart watch, a tablet computer, a personal digital assistant (personal digital assistant, PDA), or a notebook computer.

DESCRIPTION OF EMBODIMENTS

First Implementation

Figure 1:
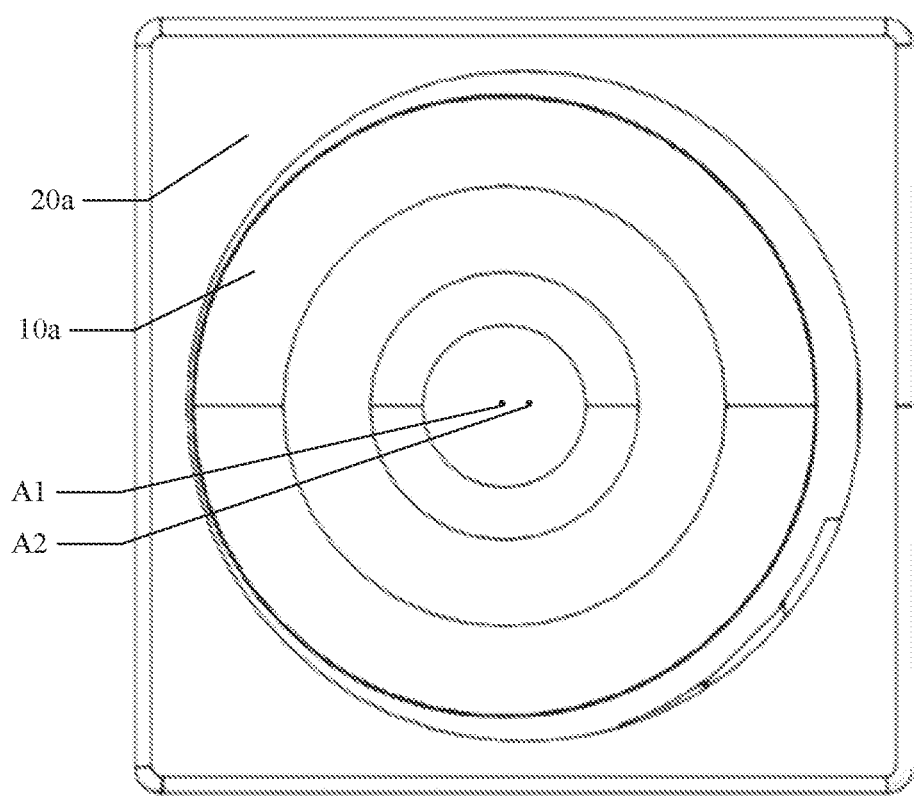
FIG. 1 is a top view of a motor in a powered-off state in the conventional technology.
Figure 2:
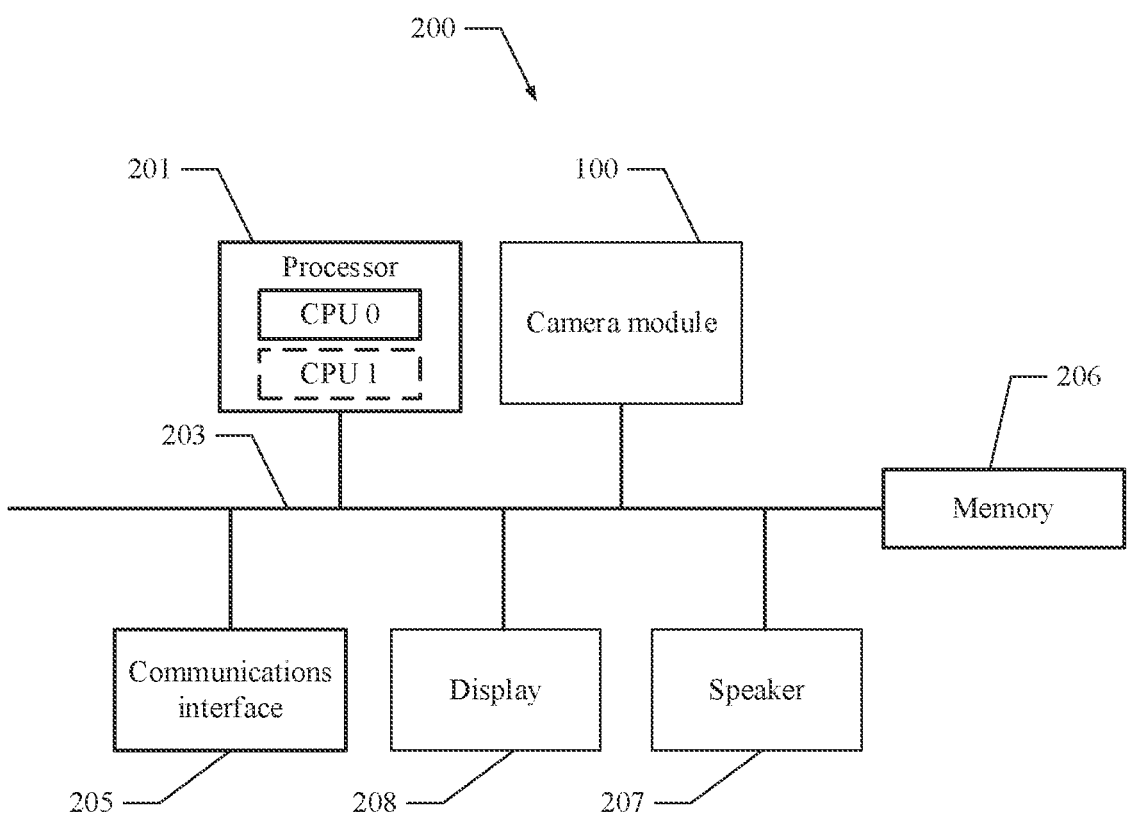
FIG. 2 is a block diagram of a structure of a mobile terminal according to a first implementation of this application.

FIG. 2 is a block diagram of a structure of a mobile terminal according to a first implementation of this application. The mobile terminal 200 includes a camera module 100, a processor 201, a communications bus 203, at least one communications interface 205, and a memory 206. The processor 201 is communicatively connected to the camera module 100, the at least one communications interface 205, and the memory 206 through the communications bus 203. The mobile terminal 100 may be any of various types of consumer electronic devices that can be easily held in a user's hand during normal use. Specifically, the mobile terminal 100 may be an electronic device equipped with the camera module 100, such as a smartphone, a smart watch, a tablet computer, a personal digital assistant (personal digital assistant, PDA), or a notebook computer.

The processor 201 may be a central processing unit (Central Processing Unit, CPU), or may be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA), or another programmable logic device, a discrete gate or transistor logic device, a discrete hardware component, or the like. The general-purpose processor may be a microprocessor, or the processor may be any conventional processor or the like. The processor 201 is a control center of the mobile terminal 200, and connects all parts of the entire mobile terminal 200 through various interfaces and lines. The communications bus 203 may include a path for transferring information between the foregoing components.

The communications interface 205 is any apparatus such as a transceiver, and is configured to communicate with another device or communications network, for example, the Ethernet, a radio access network (radio access network, RAN), or a wireless local area network (wireless local area network, WLAN).

The memory 206 may be configured to store a computer program and/or module, and the processor 201 implements various functions of the mobile terminal 200 by running or executing the computer program and/or module stored in the memory 206 and invoking data stored in the memory 206. The memory 206 may mainly include a program storage area and a data storage area. The program storage area may store an operating system, an application program (such as a sound playing function or an image playing function) that is required by a plurality of functions, and the like. The data storage area may store data (such as audio data or a phone book) that is created based on use of the terminal 200, and the like. In addition, the memory 206 may include a high-speed random access memory, and may further include a non-volatile memory such as a hard disk, an internal memory, and a removable hard disk, a smart media card (Smart Media Card, SMC), a secure digital (Secure Digital, SD) card, a flash card (Flash Card), a plurality of disk storage devices, a flash memory device, or another volatile solid-state storage device. The memory 206 may exist independently, and is connected to the processor 201 through the communications bus 203. Alternatively, the memory 206 may be integrated with the processor 201.

In specific implementation, in an embodiment, the mobile terminal 200 may include a plurality of processors 201, for example, a CPU 0 and a CPU 1 in FIG. 2. Each of the processors 201 may be a single-core (single-CPU) processor or a multi-core (multi-CPU) processor. Herein, the processor may be one or more devices, circuits, and/or processing cores configured to process data (for example, computer program instructions).

In this implementation, the mobile terminal 200 further includes a speaker 207 and a display 208 that are electrically connected to the processor 201. It may be understood that FIG. 2 is merely an example of the mobile terminal 200, and does not constitute a limitation to the mobile terminal 200. The mobile terminal 200 may include more or fewer components than those shown in FIG. 2, or some components may be combined, or there may be different components. For example, the mobile terminal 200 may further include an input/output device, a network access device, and the like, which is not limited herein.

Figure 3:
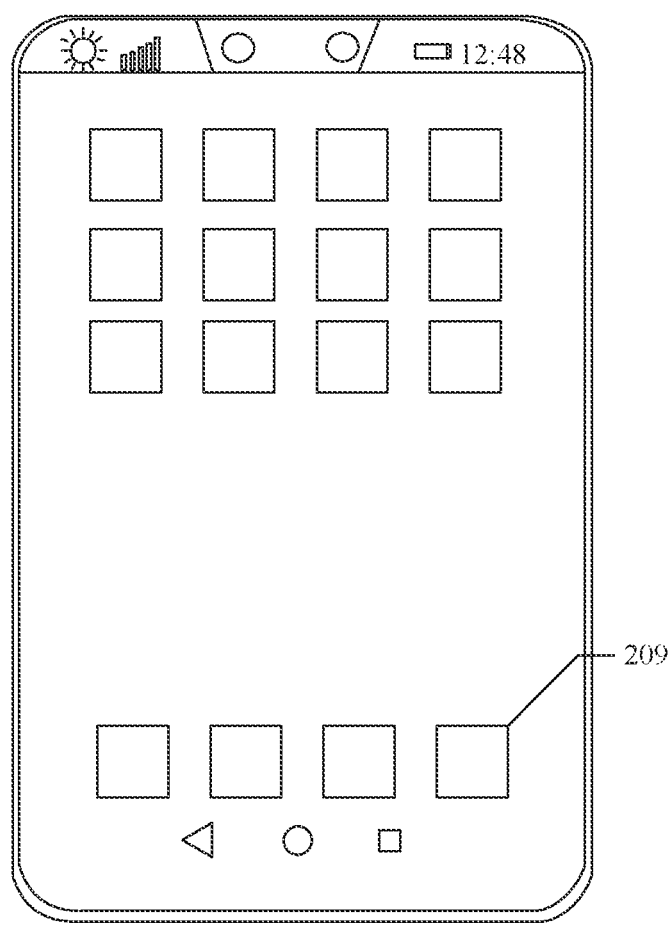
FIG. 3 is a schematic diagram of an application scenario of a mobile terminal.
Figure 4:
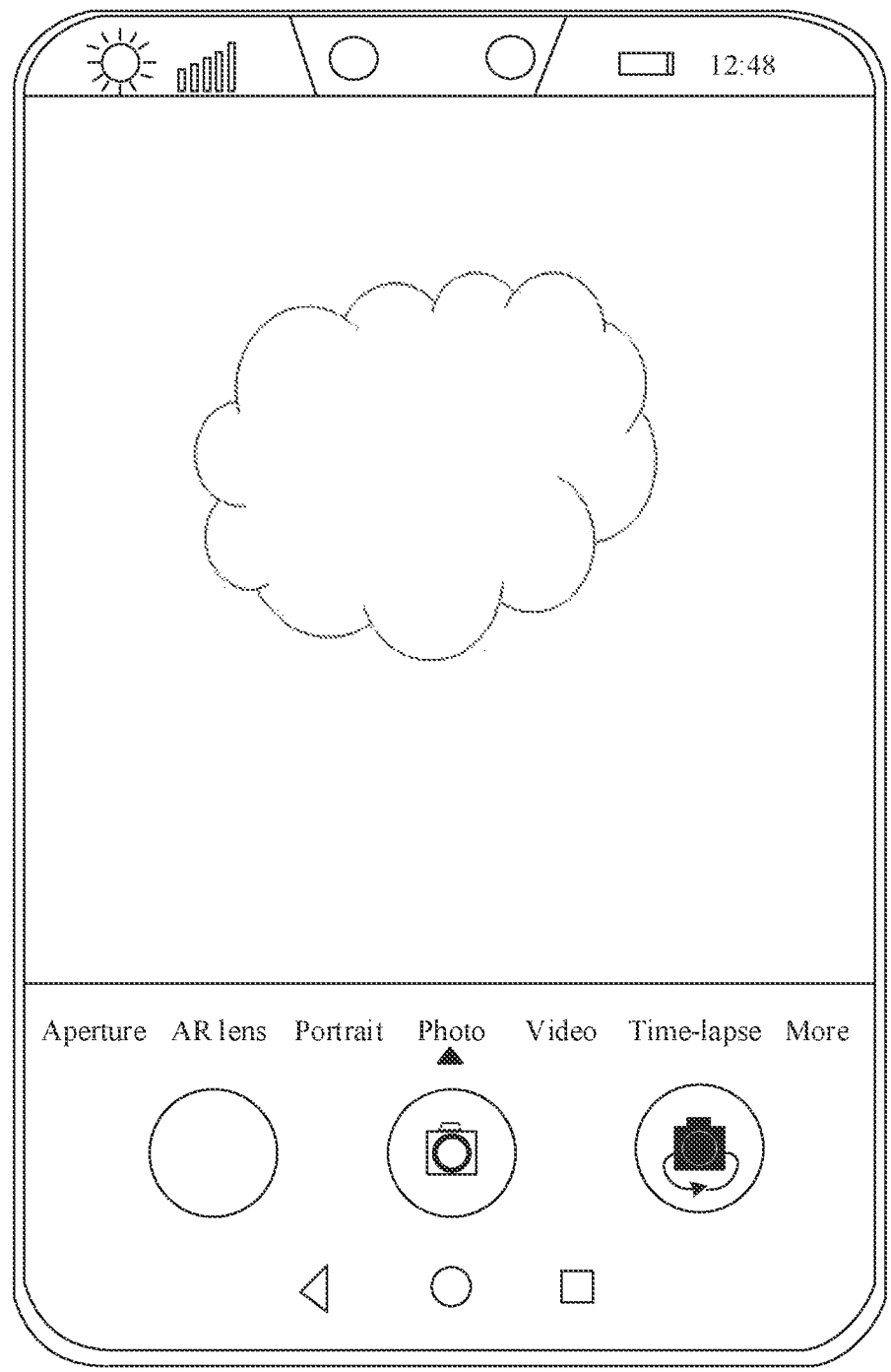
FIG. 4 is a schematic diagram of the mobile terminal shown in FIG. 3 entering a camera interface.

FIG. 3 is a schematic diagram of an application scenario of a mobile terminal. In an application scenario, the mobile terminal 200 is a consumer electronic device such as a smartphone. When the processor 201 detects a trigger event corresponding to a virtual key 209 of a camera application, the camera module 100 is controlled to start and enter a capturing interface (as shown in FIG. 4), to facilitate a user to capture an image. It can be understood that the camera module 100 may be a front-facing camera module of the mobile terminal 200 or a rear-facing camera module of the mobile terminal 200. The application scenario of the mobile terminal 200 shown in FIG. 3 and FIG. 4 is merely an example, which is not limited in this application.

Figure 5:
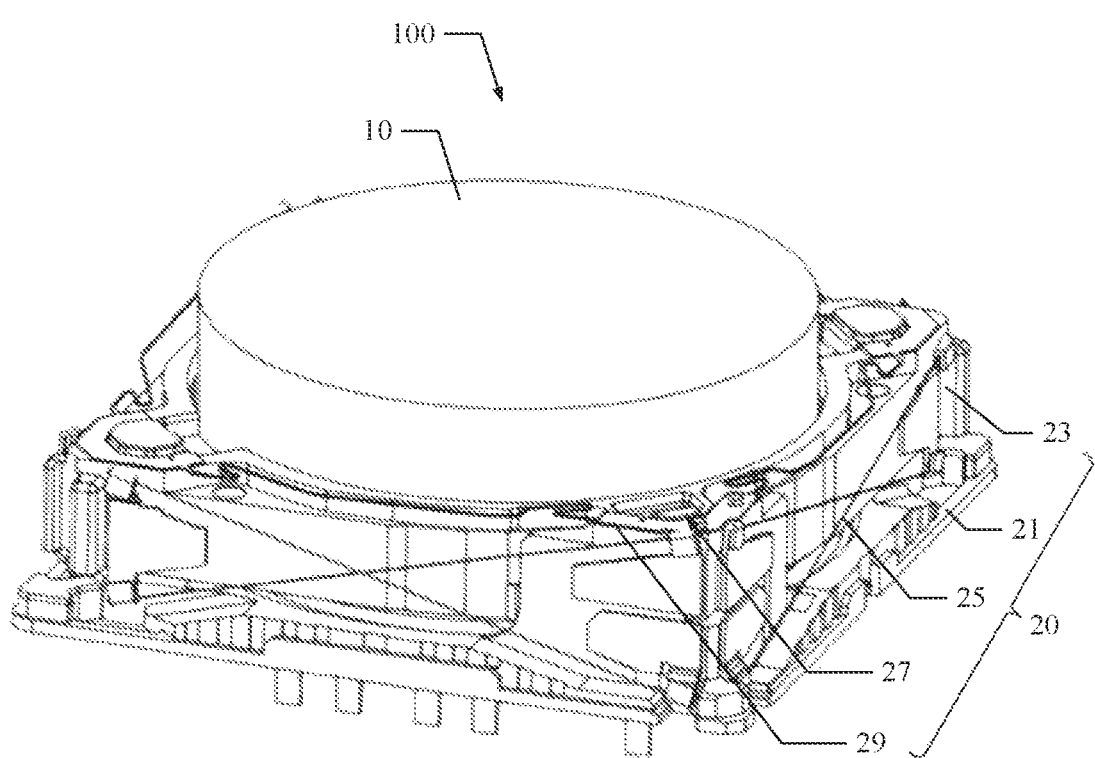
FIG. 5 is a schematic perspective view of assembly of a camera module according to the first implementation of this application.

FIG. 5 is a schematic perspective view of assembly of a camera module of the mobile terminal according to the first implementation of this application. The camera module 100 includes a lens 10 and a motor 20. The lens 10 includes one or more lenses. The motor 20 includes a base 21, a support base 23, a shape memory alloy actuator 25, an eccentricity-prevention magnetic assembly 27, and an eccentricity-prevention elastic structure 29. The base 21 and the support base 23 are disposed in a stacked manner. The lens 10 is fastened onto the support base 21. The shape memory alloy actuator 25 is fixedly connected between the support base 21 and the base 23. The shape memory alloy actuator 25 is configured to drive the support base 23 to move relative to the base 21, thereby implementing the functions of autofocus and optical image stabilization. The eccentricity-prevention magnetic assembly 27 includes a first eccentricity-prevention member 271 fastened to the base 21 and a second eccentricity-prevention member 273 fastened to the support base 23. The first eccentricity-prevention member 271 and the second eccentricity-prevention member 273 have magnetostatic forces therebetween. The eccentricity-prevention elastic structure 29 is fixedly connected between the base 21 and the support base 23.

When the motor 20 is in a powered-off state, due to the action of a magnetic force of the eccentricity-prevention magnetic assembly 27 and an elastic force of the eccentricity-prevention elastic structure 29, a first central axis of the base 21 coincides with a second central axis of the support base 23, so that a possibility of the problem of eccentricity of the motor 20 is reduced. The first central axis of the base 21 may substantially coincide with the second central axis of the support base 23, which means that the motor 20 may be slightly eccentric due to errors, but this does not affect the appearance of the camera module 100.

In the powered-off state, none of the shape memory alloy actuators 25 are energized. In other words, the shape memory alloy actuators 25 cannot provide a driving force for the support base 23 to move relative to the base 21. The motor 20 further includes a powered-on state. In the powered-on state, the processor 201 controls to supply power to the shape memory alloy actuators 25, and the shape memory alloy actuators 25 overcome the magnetostatic forces between the first eccentricity-prevention member 271 and the second eccentricity-prevention member 273 and the elastic force provided by the eccentricity-prevention elastic structure 29, to drive the support base 23 to move relative to the base 21.

Figure 6:
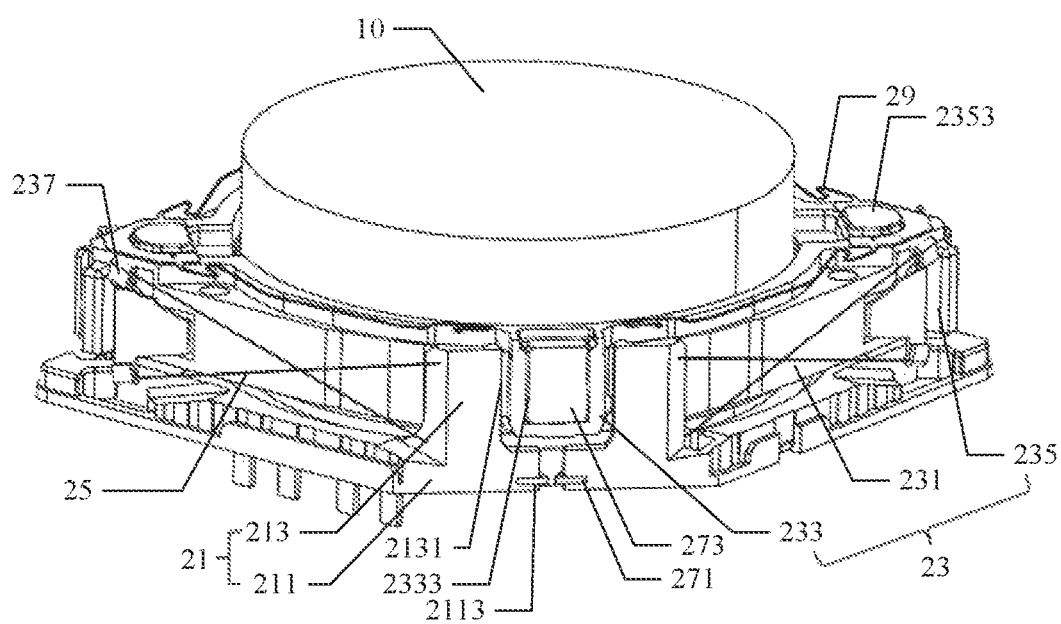
FIG. 6 is a perspective sectional view of the camera module shown in FIG. 5.
Figure 7:
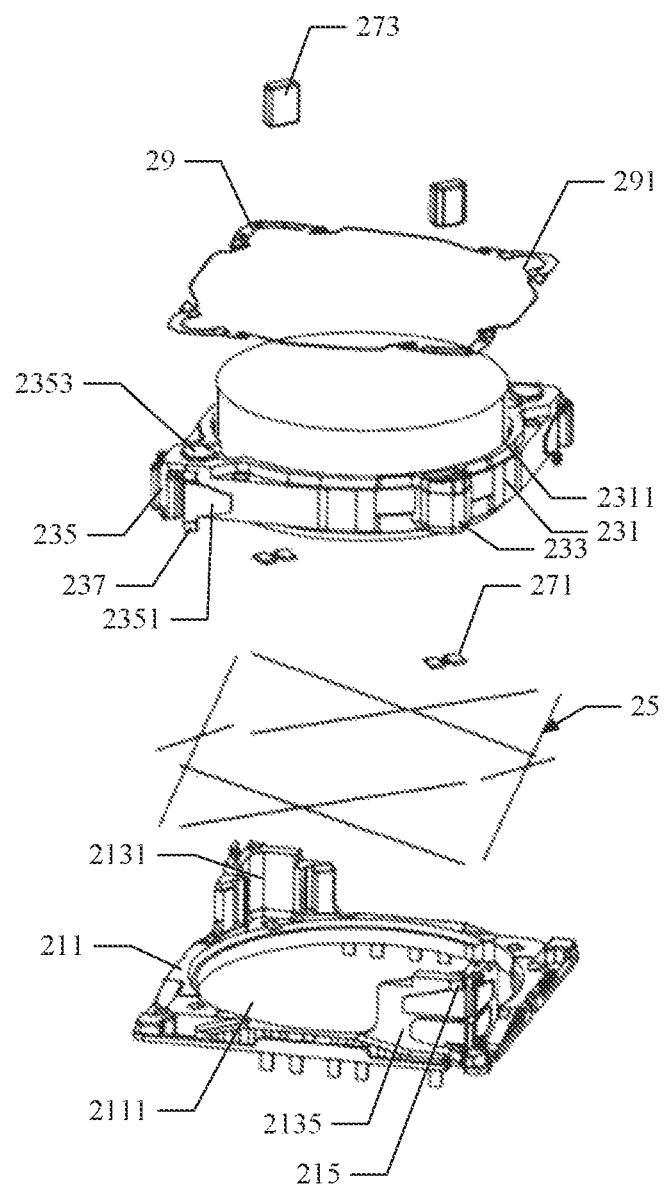
FIG. 7 is a schematic perspective exploded view of the camera module shown in FIG. 5.

Referring also to FIG. 7, FIG. 7 is a schematic perspective exploded view of the camera module shown in FIG. 5. The base 21 includes a baseplate 211 and a first limiting portion 213 protruding from the baseplate 211. The baseplate 211 is provided with a first through hole 2111. Each first limiting portion 213 is provided with a limiting groove 2131 on a side toward the first through hole 2111. Each first limiting portion 213 is further provided with a first fastening terminal 215 on an outer side wall away from the limiting groove 2131, where the first fastening terminal 215 is configured to fasten the shape memory alloy actuator 25. The baseplate 211 is provided with a first accommodating hole 2113 (as shown in FIG. 6) corresponding to a position of the limiting groove 2131, and the first eccentricity-prevention member 271 is fixedly accommodated in the first accommodating hole 2113.

The support base 23 includes a base body 231, two second limiting portions 233, and two connecting portions 235. The base body 231 is provided with a second through hole 2311. The lens 10 passes through the second through hole 2311 and is fixedly connected to the base body 231. The two second limiting portions 233 and the two connecting portions 235 protrude at intervals from an outer wall of the base body 231 away from the second through hole 2311. Each second limiting portion 233 is accommodated in one limiting groove 2131. Each second limiting portion 233 is provided with a second accommodating hole 2333 (as shown in FIG. 6), and the second eccentricity-prevention member 273 is fastened in the second accommodating hole 2333. When the motor 20 is in a powered-off state, due to the action of a magnetostatic force of the eccentricity-prevention magnetic assembly 27 and elasticity of the eccentricity-prevention elastic structure 29, the bottom of the second limiting portion 233 facing the baseplate 211 fits together with the baseplate 211, and the first central axis of the base 21 coincides with the second central axis of support base 23. It can be understood that the structure and shape of the support base 23 are not limited. For example, the support base 23 is substantially in the shape of a rectangular parallelepiped, and each of the two second limiting portions 233 and the two connecting portions 235 is a corner of the support base 23.

There are eight shape memory alloy actuators 25. Shape memory alloy (Shape memory alloy, shape memory alloy for short) is a general term for a class of metals with shape memory effect. When an ordinary metal material is subject to an external force, elastic deformation occurs first, and the metal returns to its original shape when the external force is removed. As the external force is increased to reach a yield point of the metal, plastic deformation occurs, in which permanent deformation remains after the external force is removed, and the metal does not return to its original shape even if heated. A shape memory alloy material is an alloy material that can be heated to completely eliminate its deformation at a lower temperature and return to its original shape before deformation.

It is generally believed that a shape memory alloy has two states: one is the austenite phase at high temperature, which exists in the form of cubic crystals; the other is the martensite phase at low temperature, which exists in the form of monoclinic crystals. A transformation from austenite into martensite is referred to as a martensitic transformation, and a transformation from martensite into austenite is referred to as a reverse martensitic transformation. The basic operating principle of the shape memory alloy material is to heat the material to a critical temperature or higher for shape memory heat treatment (training), and make the material deform to some extent. When the material is cooled to form the martensite phase and then is heated again to the critical temperature or higher, the low-temperature martensite phase is reversed to the high-temperature austenite phase (that is, a reverse transformation occurs), so that the material returns to its remembered pre-deformed state.

In the application of the shape memory alloy material to a driving process of a motor, shape memory alloy wires are energized, and heat produced raises the temperature of the wires to implement the reverse transformation from the low-temperature martensite phase into the high-temperature austenite phase, recalling the memory before deformation. As a result, the wires contract and drive a related load component, to implement the focusing and image stabilization functions. When the power is stopped, the temperature of the wires decreases, and the wires get loose under the action of a resilience force of the load.

The first eccentricity-prevention member 271 is a magnetizer, and the second eccentricity-prevention member 273 is a permanent magnet. In this implementation, there are two eccentricity-prevention magnetic assemblies 27, and each eccentricity-prevention magnetic assembly 27 has two first eccentricity-prevention members 271 and one second eccentricity-prevention member 273. It can be understood that a quantity of eccentricity-prevention magnetic assemblies 27 is not limited, and a quantity of first eccentricity-prevention members 271 and second eccentricity-prevention members 273 in the eccentricity-prevention magnetic assembly 27 is not limited.

The eccentricity-prevention elastic structure 29 is substantially ring-shaped. The eccentricity-prevention elastic structure 29 is fixedly connected between the support base 23 and the base 21. In this implementation, the eccentricity-prevention elastic structure 29 is fastened to an end face of the connecting portion 235 away from the baseplate 211 and an end face of the first limiting portion 213 away from the baseplate 211 by using an adhesive, so that the eccentricity-prevention elastic structure 29 is fixedly connected to the support base 23 and the base 21. The end face of the connecting portion 235 away from the baseplate 211 is further provided with an abutting bump 2353. The eccentricity-prevention elastic structure 29 is provided with a slot 291. The abutting bump 2353 is accommodated in the slot 291 to strengthen connection stability between the eccentricity-prevention elastic structure 29 and the support base 23. An opening of the slot 291 is disposed toward the center of the eccentricity-prevention elastic structure 29.

The eccentricity-prevention elastic structure 29 is electrically connected to each of the shape memory alloy actuators 25 to serve as a common ground (common, namely common ground) of the motor 20. In other words, the eccentricity-prevention elastic structure 29 acts as an electrical connection while providing an elastic force for the support base 23, which is beneficial to simplification of the structure and wiring of the motor 60. It can be understood that the eccentricity-prevention elastic structure 29 may not be electrically connected to each of the shape memory alloy actuators 25; the shape of the eccentricity-prevention elastic structure 29 is not limited, and a quantity of eccentricity-prevention elastic structures 29 is not limited.

Figure 8:
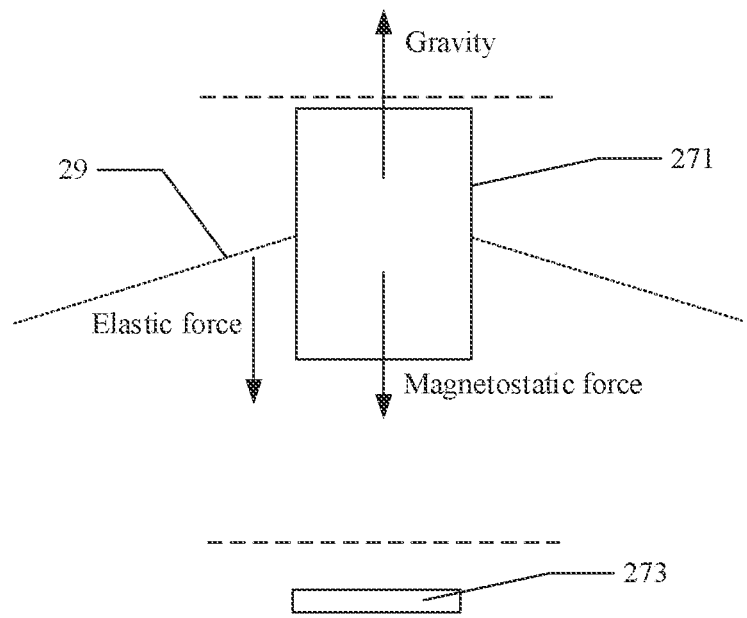
FIG. 8 is a schematic force diagram of a partial structure of a motor in a powered-off state in an application scenario.

When in use, the mobile terminal 200 may be placed vertically, horizontally, obliquely, or in another posture. For example, in an application scenario, as shown in FIG. 8, the motor 20 is in a powered-on state, there is a relatively large distance between the first eccentricity-prevention member 271 and the second eccentricity-prevention member 273, and the direction of gravity received by the first eccentricity-prevention member 271 is opposite to that of a magnetostatic force received by the first eccentricity-prevention member 271 from the second eccentricity-prevention member 273. If the camera module 100 does not require image stabilization and focusing, the processor 201 controls the motor 20 to be powered off. If a magnetostatic force between the first eccentricity-prevention member 271 and the second eccentricity-prevention member 273 is too small to overcome gravity received by the support base 23, and the base 21 is in close contact with the support base 23, the eccentricity-prevention elastic structure 29 may provide an elastic force in the same direction as the magnetostatic force, so that the support base 23 moves toward the base 21 and fits together with the base 21.

Figure 9:
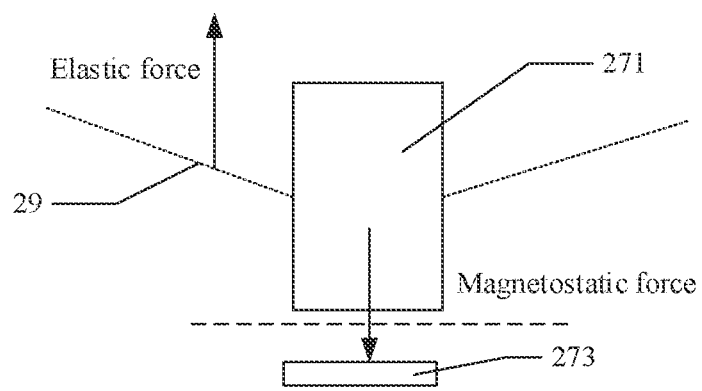
FIG. 9 is a schematic force diagram of a partial structure of the motor in a powered-on state in another application scenario.

For another example, in another application scenario, the motor 20 is in a powered-off state, and the base 21 and the support base 23 are in close contact. When the camera module 100 requires image stabilization and focusing, the processor 201 controls to supply power to the shape memory alloy actuator 25, if a magnetostatic force between the first eccentricity-prevention member 271 and the second eccentricity-prevention member 273 is relatively large, and a driving force provided by the shape memory alloy actuator 25 is not enough to overcome the magnetostatic force, the direction of an elastic force of the eccentricity-prevention elastic structure 29 is opposite to that of the magnetostatic force. Refer to FIG. 9. The eccentricity-prevention elastic structure 29 provides assistance to the shape memory alloy actuator 25, so that the support base 23 is separated from the base 21 to implement the image stabilization and focusing functions. The direction of gravity, the direction of magnetostatic force, and the direction of elastic force in FIG. 8 and FIG. 9 are merely an example.

In conclusion, the eccentricity-prevention elastic structure 29 can assist the eccentricity-prevention magnetic assembly 27 in making the first central axis of the base 21 coincide with the second central axis of the support base 23, or assist the shape memory alloy actuator 25 in driving the support base 23 to move relative to the base 21, to implement image stabilization and focusing.

In an implementation, the first accommodating hole 2113 is omitted, and the first eccentricity-prevention member 271 is directly fastened to the baseplate 211 of the base 21 or another portion; the second accommodating hole 2333 is omitted, and the second eccentricity-prevention member 273 is directly fastened to the second limiting portion 233 of the support base 23 or another portion. A magnetostatic force between the first eccentricity-prevention member 271 and the second eccentricity-prevention member 273 can cause the base 21 and the support base 23 to fit each other when the motor 20 is in a powered-off state, so that the first central axis of the base 21 can coincide with the second central axis of the support base 23.

In this implementation, still refer to FIG. 7. The baseplate 211 is substantially rectangular, the two first limiting portions 213 are disposed on one diagonal line (first diagonal line) of the baseplate 211 and around the edge of the first through hole 211, and each of the first limiting portions 213 is located at one corner of the baseplate 211. The two connecting portions 235 are substantially located on the other diagonal line (second diagonal line) of the baseplate 211, and each connecting portion 235 is correspondingly disposed at one corner of the baseplate 211. In other words, each of the two connecting portions 235 and the two second limiting portions 233 is disposed corresponding to one corner of the baseplate 211.

More specifically, the first limiting portion 213 includes two secondary mounting portions 2135 (as shown in FIG. 7) that are fixedly connected. The two secondary mounting portions 2135 together form the limiting groove 2131. Each secondary mounting portion 2135 is protruded with two first fastening terminals 215, where one first fastening terminal 215 is provided at an end of the secondary mounting portion 2135 adjacent to the baseplate 211, and the other first fastening terminal 215 is provided at an end of the secondary mounting portion 2135 away from the baseplate 211. The connecting portion 235 includes two secondary connecting portions 2351 that are fixedly connected and disposed away from the second through hole 2311. Each secondary connecting portion 2351 is provided with two second fastening terminals 237, where one second fastening terminal 237 is provided at an end of the secondary connecting portion 2351 adjacent to the baseplate 211, and the other second fastening terminal 237 is provided at an end of the secondary connecting portion 2351 away from the baseplate 211. Each shape memory alloy actuator 25 is fixedly connected between one first fastening terminal 215 and one second fastening terminal 237.

In this implementation, the motor 20 has four side portions; the two secondary mounting portions 2135 of each first limiting portion 213 are substantially perpendicular to each other, and the two secondary connecting portions 2351 of each connecting portion 235 are substantially perpendicular to each other. Therefore, each secondary mounting portion 2135 and a corresponding secondary connecting portion 2351 are disposed on the same side of the motor 20. Two shape memory alloy actuators 25 on the same side of the motor 20 are disposed crosswise.

Figure 10:
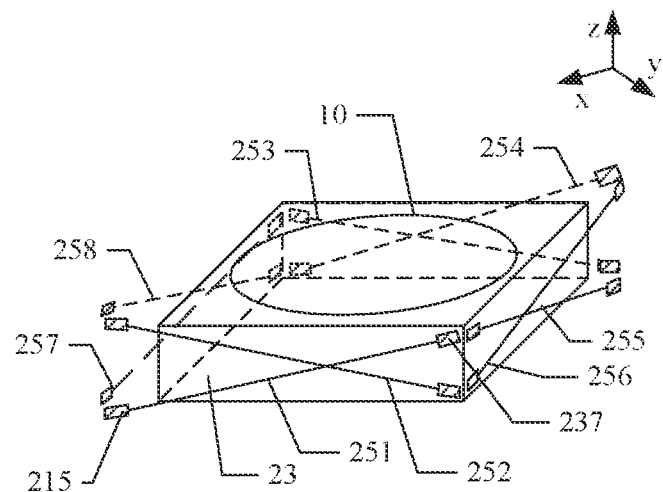
FIG. 10 is a schematic diagram of a structure of the motor.

FIG. 10 is a schematic diagram of a structure of the motor. The support base 23 is represented by a rectangular structure in FIG. 10. The base 21 is omitted in FIG. 10. Eight shape memory alloy actuators that are equal in length and symmetrical in distribution are each connected between the first fastening terminal 215 of the base 21 and the second fastening terminal 237 of the support base 23. The shape memory alloy actuator 25 includes a number 1 actuator 251, a number 2 actuator 252, a number 3 actuator 253, a number 4 actuator 254, a number 5 actuator 255, a number 6 actuator 256, a number 7 actuator 257, and a number 8 actuator 258. The processor 201 is configured to control to supply power to the number 1 actuator 251, the number 2 actuator 252, the number 3 actuator 253, the number 4 actuator 254, the number 5 actuator 255, the number 6 actuator 256, the number 7 actuator 257, and the number 8 actuator 258. It can be understood that the processor 201 may control the magnitude of a current that is input to each shape memory alloy actuator 25, or may control, for each shape memory alloy actuator 25, a voltage based on a duty cycle of pulse width modulation, to implement the functions of the camera module 100 of automatic optical image stabilization and focusing.

Basic principles of focusing and image stabilization of the camera module 100 through the eight shape memory alloy actuators (251, 252, 253, 254, 255, 256, 257, 258) are briefly described as follows:

(1) To implement focusing of the lens 10 along the z-axis, the actuators numbered 1, 3, 5, and 7 (251, 253, 255, 257) are energized and heated to contract, and the four actuators that symmetrically contract generate a resultant force in the −z-axis direction, driving the structure of the support base 23 and the lens 10 to implement focusing in the −z-axis direction. Similarly, the actuators numbered 2, 4, 6, and 8 (252, 254, 256, 258) are energized and heated to contract, and the four actuators that symmetrically contract generate a resultant force in the +z-axis direction, to implement focusing in the +z-axis direction. In a stable state, the actuators numbered 1, 3, 5, and 7 (251, 253, 255, 257) as a group and the actuators numbered 2, 4, 6, and 8 (252, 254, 256, 258) as a group generate forces to create an equilibrium of forces under the weight of an assembly of the lens 10 and the support base 23.

(2) To implement translational image stabilization (that is, a lens shift mode) of the lens 10, the actuators numbered 3, 4, 5, and 6 (253, 254, 255, 256) as a group are energized to generate a force, and the actuators numbered 1, 2, 7, and 8 (251, 252, 257, 258) as a group are energized to generate a force, resulting in a pair of opposing forces in the x-axis direction. When a resultant force of the group of the actuators numbered 1, 2, 7, and 8 (251, 252, 257, 258) is less than a resultant force of the group of the actuators numbered 3, 4, 5, and 6 (253, 254, 255, 256) (1-2-7-8<3-4-5-6), a translation in the +x axis direction occurs, that is, the support base 23 drives the lens 10 to translate in the +x axis direction. When the resultant force of the group of the actuators numbered 1, 2, 7, and 8 (251, 252, 257, 258) is greater than the resultant force of the group of the actuators numbered 3, 4, 5, and 6 (253, 254, 255, 256) (1-2-7-8>3-4-5-6), a translation in the −x direction occurs, that is, the support base 23 drives the lens 10 to translate in the −x axis direction. In this way, the translational image stabilization relative to the position of an image sensor in the x axis direction is implemented. In a stable state, the resultant force of the group of the actuators numbered 1, 2, 7, and 8 (251, 252, 257, 258) is equal to the resultant force of the group of the actuators numbered 3, 4, 5, and 6 (253, 254, 255, 256), that is, the force generated by the wires 1, 2, 7, and 8 and the force generated by the wires 3, 4, 5, and 6 are in equilibrium.

Similarly, the actuators numbered 1, 2, 5, and 6 (251, 252, 255, 256) as a group are energized to generate a force, and the actuators numbered 3, 4, 7, and 8 (253, 254, 257, 258) as a group are energized to generate a force, resulting in a pair of opposing forces in the y-axis direction and implementing the translational image stabilization of the lens 10 in the y-axis direction.

(3) To implement tilted image stabilization (lens tilt mode) of the lens 10, the actuators numbered 3 and 7 (253, 257) as a group are energized to contract, and the actuators numbered 2 and 6 (252, 256) as a group are energized to contract, so that the support base 23 drives the lens 10 to rotate clockwise around the x-axis; the actuators numbered 1 and 5 (251, 255) as a group are energized to contract, and the actuators numbered 4 and 8 (254, 258) are energized to contract, resulting in a counterclockwise rotation around the x-axis. When stable, a torsional force generated by the actuators numbered 3 and 7 (253, 257) and the actuators numbered 2 and 6 (252, 256) and a torsional force generated by the actuators numbered 1 and 5 (251, 255) and the actuators numbered 4 and 8 (254, 258) are in equilibrium, thereby forming the tilted image stabilization of the lens around the x-axis. Similarly, the actuators numbered 1 and 7 (251, 257) and the actuators numbered 4 and 6 (254, 256) are energized to contract, resulting in a clockwise rotation around the y-axis; the actuators numbered 3 and 5 (253, 255) and the actuators numbered 2 and 8 (252, 258) are energized to contract, resulting in a counterclockwise rotation around the y-axis. An equilibrium of forces is formed based on the same principle as above, and finally the tilted image stabilization of the lens around the y-axis is implemented.

In an implementation, the quantity and arrangement of the shape memory alloy actuators 25 are not limited, as long as they can drive the support base 23 to move relative to the base 21.

In an implementation, the arrangement of the eccentricity-prevention magnetic assembly 27 on the base 21 and the support base 23 is not limited, as long as the action of the magnetic force of the eccentricity-prevention magnetic assembly 27 on the support base 23 and the base 21 causes the first central axis of the base 21 to coincide with the second central axis of the support base 23.

When the motor 20 is powered off, due to the action of the magnetostatic force of the eccentricity-prevention magnetic assembly 27 and/or the elastic force of the eccentricity-prevention elastic structure 29, the support base (rotor) 23 and the base (stator) 21 keep in close contact at any posture, and there is no eccentricity. When the motor 20 is powered on, the shape memory alloy actuator 25 (SMA wire) is energized and heated to contract. A pulling force of the shape memory alloy actuator 25 overcomes the magnetostatic force and/or the elastic force to separate the support base 23 of the motor 20 from the base (stator) 21. The support base 23 is in an eight-wire suspension state, and the autofocus (AF) and optical image stabilization (OIS) actions are completed in this state.

Second Implementation

Figure 11:
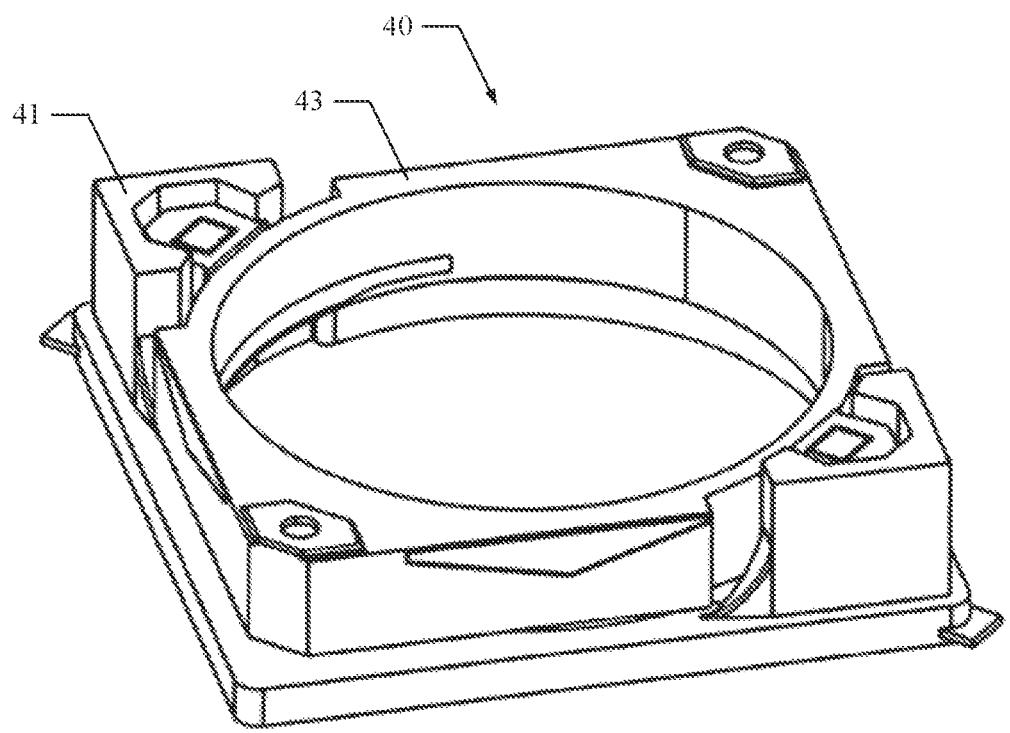
FIG. 11 is a schematic perspective view of assembly of a motor according to a second implementation of this application.
Figure 12:
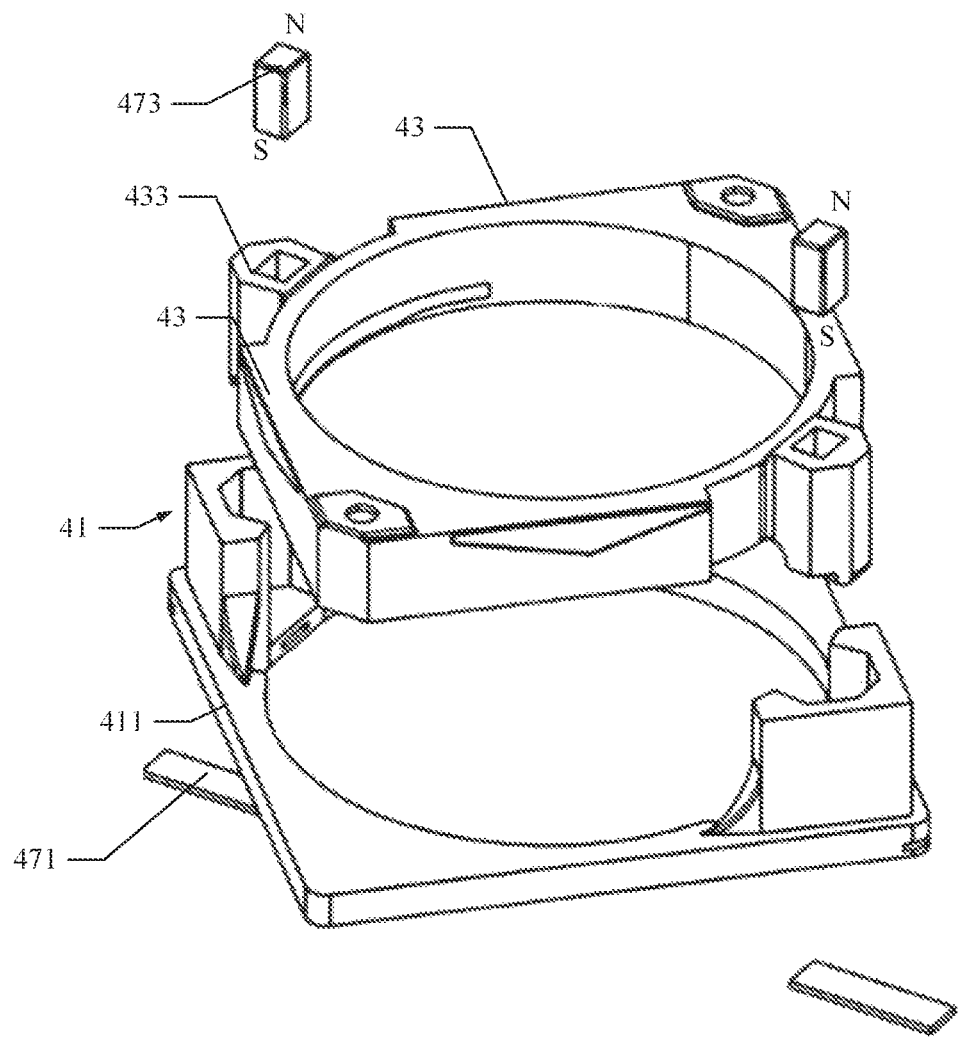
FIG. 12 is a schematic perspective exploded view of the motor shown in FIG. 11.
Figure 13:
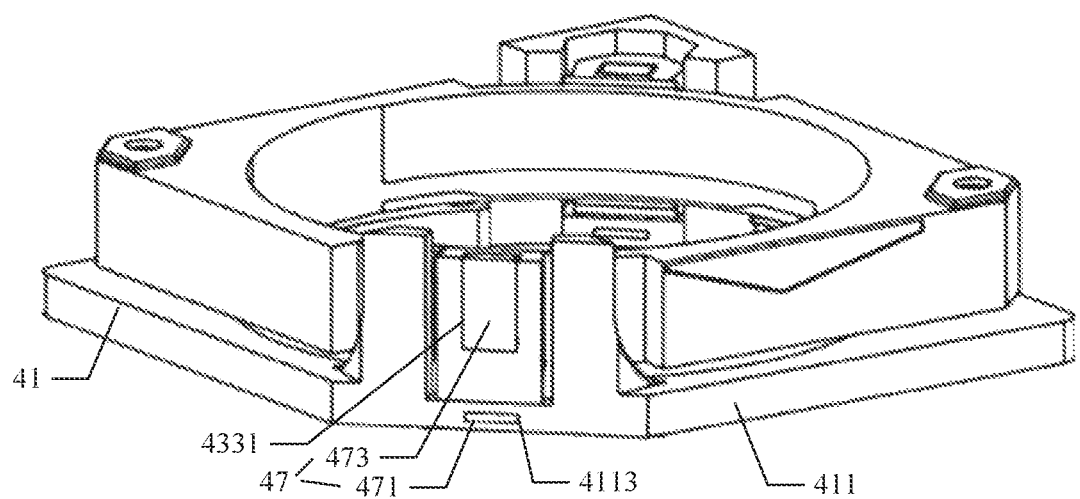
FIG. 13 is a perspective sectional view of the motor shown in FIG. 11.

FIG. 11 is a schematic perspective view of assembly of a motor according to a second implementation of this application. FIG. 12 is a schematic perspective exploded view of the motor shown in FIG. 11, and FIG. 13 is a perspective sectional view of the motor shown in FIG. 11. The structure of the motor 40 provided in the second implementation is substantially the same as that of the motor 20 provided in the first implementation, except that the eccentricity-prevention elastic structure is omitted in the motor 40.

More specifically, a support base 43 is substantially rectangular, and each eccentricity-prevention magnetic assembly 47 includes a first eccentricity-prevention member 471 and a second eccentricity-prevention member 473. In each eccentricity-prevention magnetic assembly 47, a first eccentricity-prevention member 471 is accommodated in a first accommodating hole 4113, a second eccentricity-prevention member 473 is accommodated in a corresponding second accommodating hole 4331, and the first eccentricity-prevention member 471 and the second eccentricity-prevention member 473 have magnetostatic forces of attraction therebetween. The first eccentricity-prevention member 471 is a magnetizer, the second eccentricity-prevention member 473 is a permanent magnet, and each eccentricity-prevention magnetic assembly 47 has one first eccentricity-prevention member 471 and one second eccentricity-prevention member 473.

When the motor 40 is in a powered-off state, because the second eccentricity-prevention member 473 is attracted by the first eccentricity-prevention member 471, that is, under the action of the magnetostatic forces of attraction between the second eccentricity-prevention member 473 and the first eccentricity-prevention member 471, the bottom of the support base 43 fits together with a baseplate 411 of a base 41, and the first eccentricity-prevention member 471 is aligned with the second eccentricity-prevention member 473, so that a first central axis of the base 41 coincides with a second central axis of the support base 43, which simplifies the structure of the motor 40 while reducing a possibility of eccentricity of the motor 40. In addition, the first eccentricity-prevention member 471 is built in the base 41, and the second eccentricity-prevention member 473 is built in the support base 43, so that the movement of the support base 43 relative to the base 41 and the wiring of the motor are not easily affected.

Third Implementation

Figure 14:
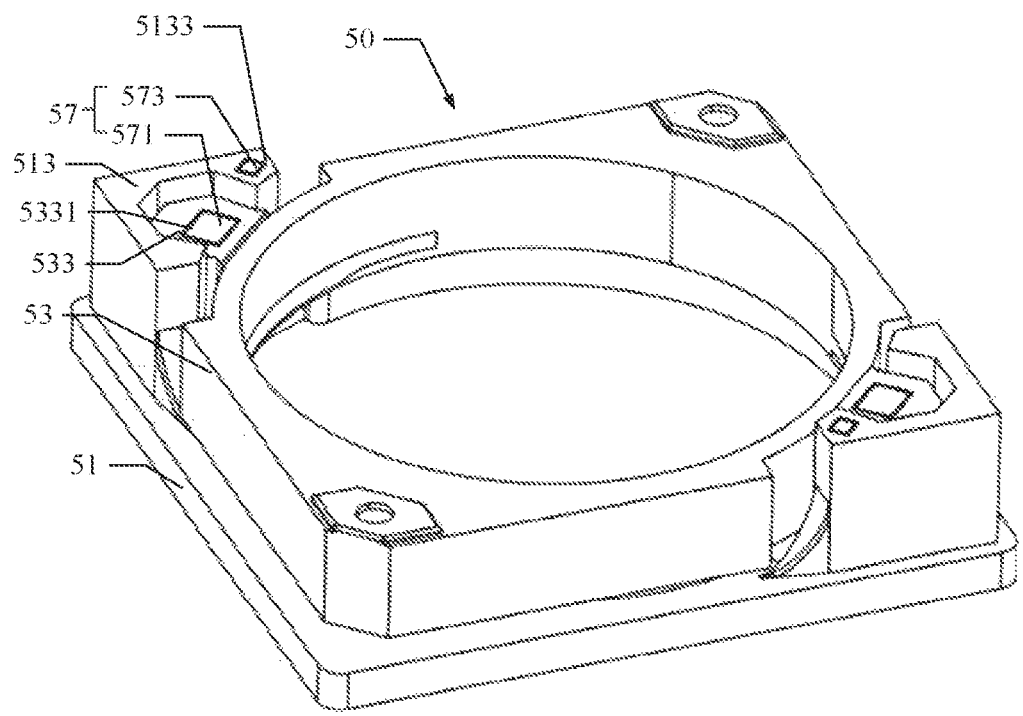
FIG. 14 is a schematic perspective view of assembly of a motor according to a third implementation of this application.
Figure 15:
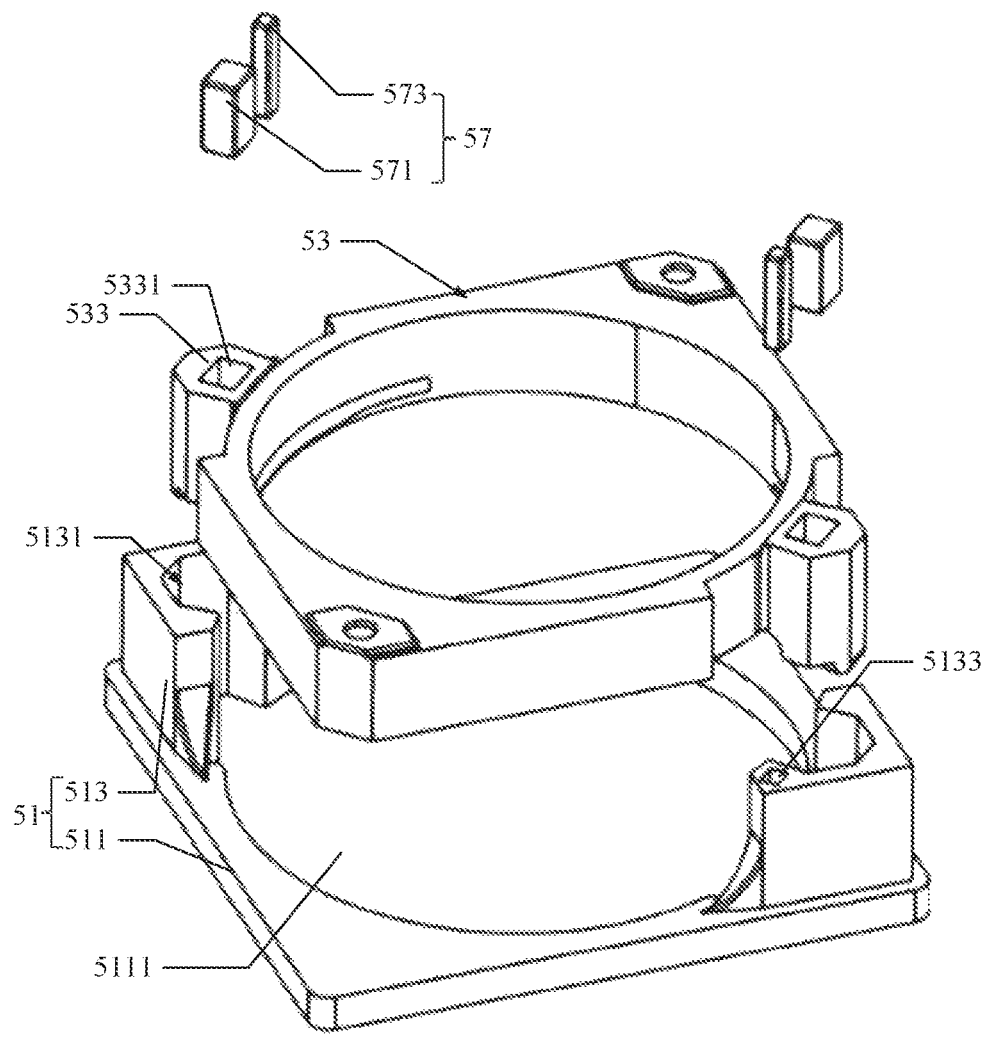
FIG. 15 is a schematic perspective exploded view of the motor shown in FIG. 14.

FIG. 14 is a schematic perspective view of assembly of a motor according to a third implementation of this application, and FIG. 15 is a schematic perspective exploded view of the motor shown in FIG. 14. The structure of the motor 50 provided in the third implementation is substantially the same as that of the motor 20 provided in the first implementation, except that the eccentricity-prevention elastic structure is omitted in the motor 50.

Specifically, the motor 50 includes a base 51, a support base 53, a shape memory alloy actuator (not shown in the figure), and an eccentricity-prevention magnetic assembly 57. The base 51 includes a baseplate 511 and a first limiting portion 513 protruding from the baseplate 511. The baseplate 511 is provided with a first through hole 5111. The first limiting portion 513 is provided with a limiting groove 5131 on a side toward the first through hole 5111, and the limiting groove 5131 extends through the baseplate 511 and communicate with the first through hole 5111. The first limiting portion 513 is provided with a first accommodating hole 5131 on an end face away from the baseplate 511. The first accommodating hole 5133 is spaced apart from the limiting groove 5131. It can be understood that the first accommodating hole 5131 may communicate with the limiting groove 5131.

The support base 53 is substantially square, and the support base 53 has a second limiting portion 533. The second limiting portion 533 is accommodated in the first limiting portion 513. The second limiting portion 533 is provided with a second accommodating hole 5331. The eccentricity-prevention magnetic assembly 57 includes a first eccentricity-prevention member 571 and a second eccentricity-prevention member 573, the first eccentricity-prevention member 571 is fixedly accommodated in the first accommodating hole 5133, and the second eccentricity-prevention member 573 is fixedly accommodated in the second accommodating hole 5331. Both the first eccentricity-prevention member 571 and the second eccentricity-prevention member 573 are permanent magnets, and the first eccentricity-prevention member 571 and the second eccentricity-prevention member 573 each have a first magnetic pole (for example, N pole) and a second magnetic pole (for example, S pole). The first magnetic pole of the first eccentricity-prevention member 571 and the second magnetic pole of the second eccentricity-prevention member 573 are disposed adjacent to each other, and the first eccentricity-prevention member 571 and the second eccentricity-prevention member 573 attract each other.

Figure 16:
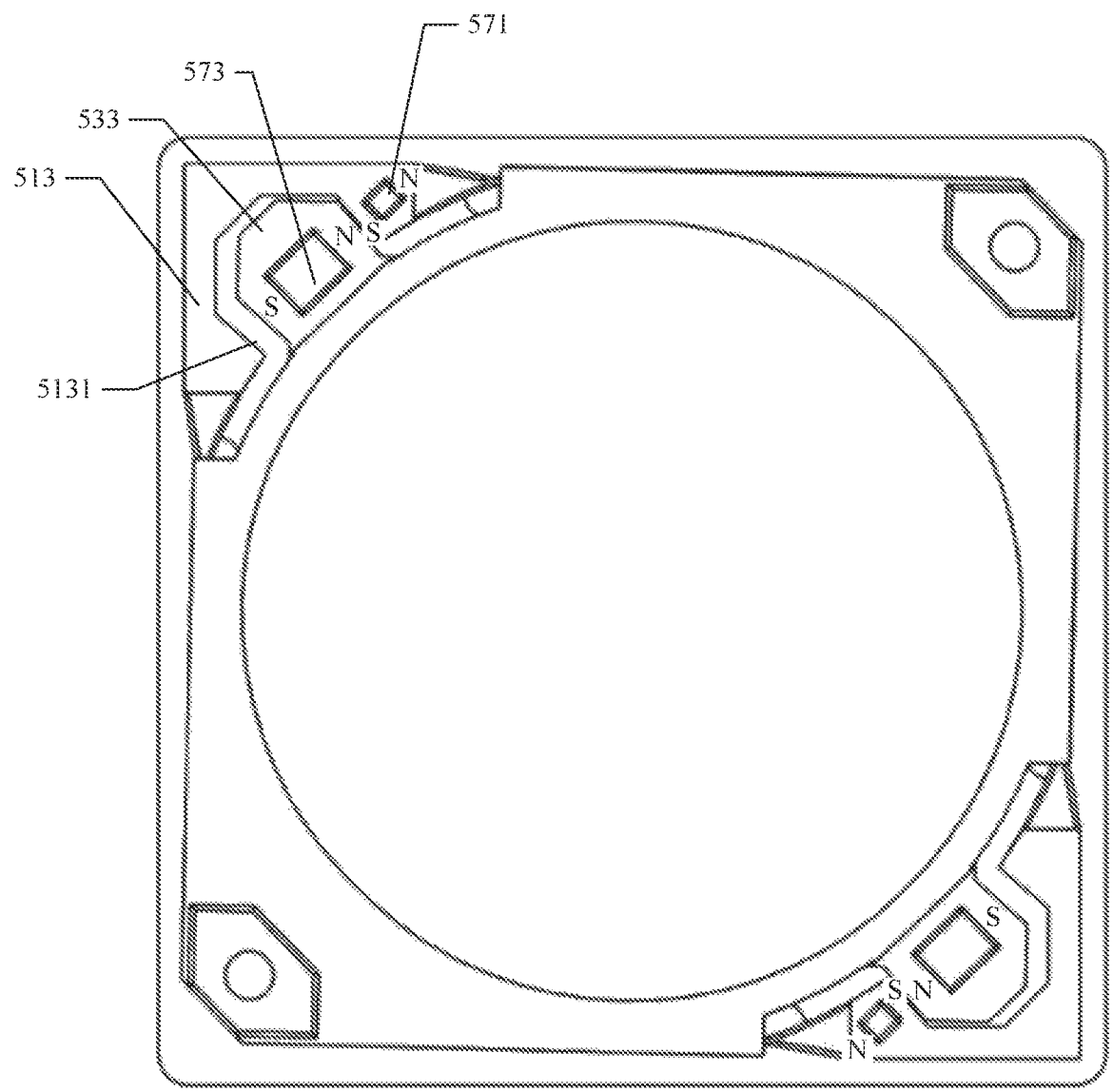
FIG. 16 is a top view of the motor shown in FIG. 14 in a powered-off state.
Figure 17:
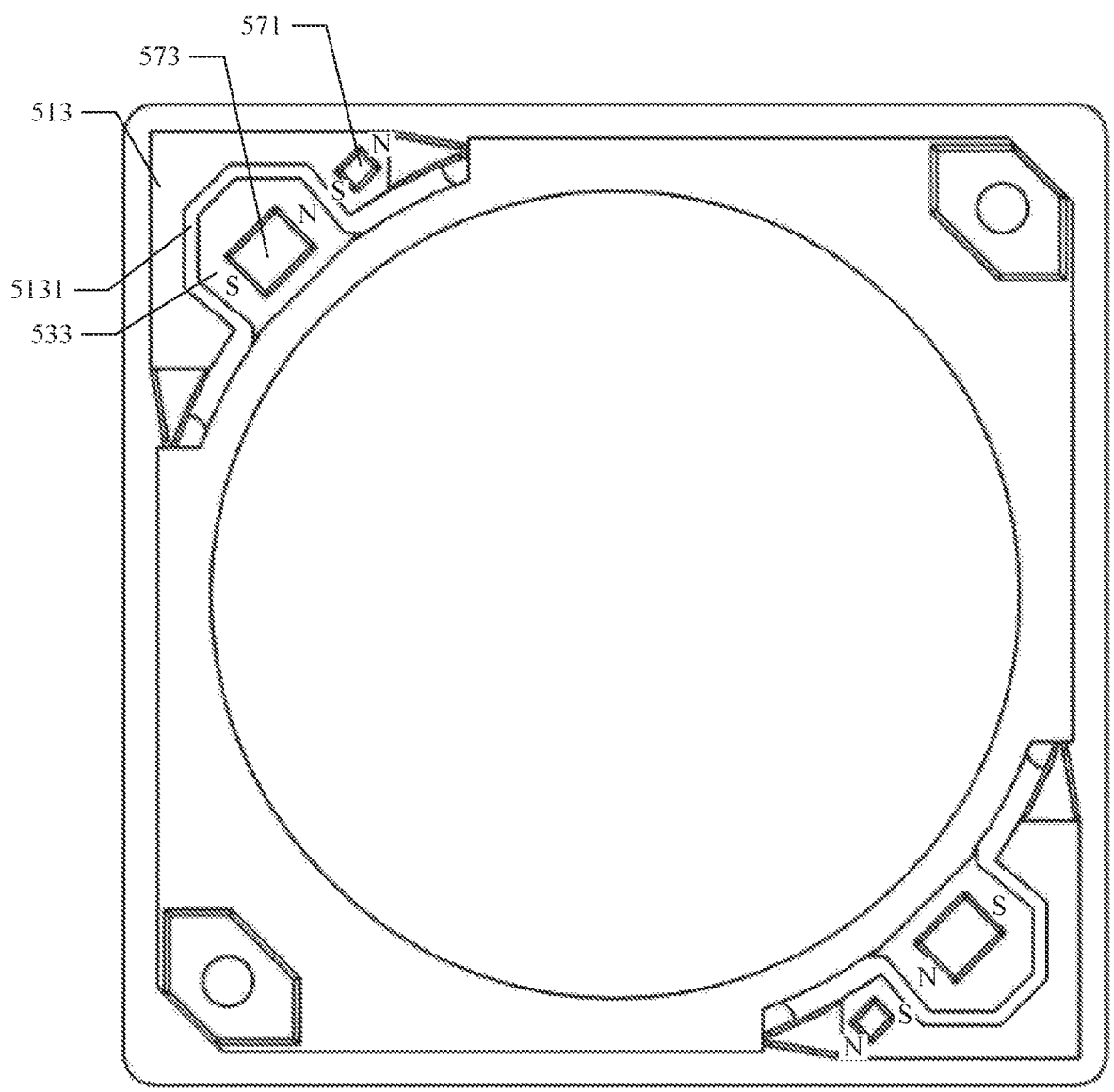
FIG. 17 is a top view of the motor shown in FIG. 14 in a powered-on state.

When the motor 50 is in a powered-off state, the support base 53 and the base 51 are subject to the action of the magnetostatic forces of attraction between the first eccentricity-prevention member 571 and the second eccentricity-prevention member 573, and part of an outer side wall of the second limiting portion 533 and part of an inner side wall of the limiting groove 5131 of the base 51 are in close contact (in side-by-side close contact), as shown in FIG. 16, so that a first central axis of the base 51 coincides with a second central axis of the support base 53. When the motor 50 is in a powered-on state, at least one of shape memory alloy actuators is energized to contract to provide a driving force to the support base 53, pulling the support base 53 to overcome the magnetostatic forces, and the support base 53 is separated from the base 51, as shown in FIG. 17. It can be understood that one of the first eccentricity-prevention member 571 and the second eccentricity-prevention member 573 is a magnet, and the other is a magnetizer.

Fourth Implementation

Figure 18:
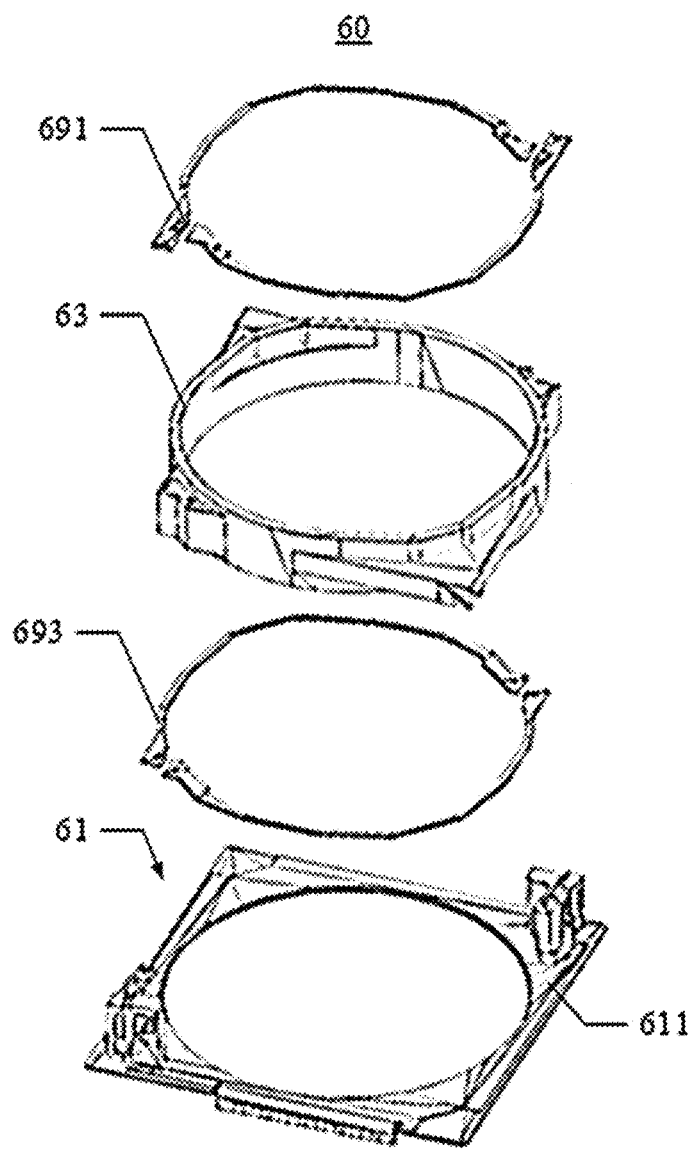
FIG. 18 is a schematic perspective exploded view of a motor according to a fourth implementation of this application.

FIG. 18 is a schematic perspective exploded view of a motor according to a fourth implementation of this application. The structure of the motor 60 provided in the fourth implementation is substantially the same as that of the motor 20 provided in the first implementation, except that the eccentricity-prevention magnetic assembly is omitted in the motor 60.

In this implementation, an eccentricity-prevention elastic structure of the motor 60 includes two first elastic members 691 and two second elastic members 693. Each first elastic member 691 is fastened between a base 61 and a support base 63 of the motor 60, and each second elastic member 693 is fastened between the base 61 and the support base 63 of the motor 60, where the second elastic member 693 is located between the first elastic member 691 and a baseplate 611 of the base 61. Both the first elastic member 691 and the second elastic member 693 are substantially arc-shaped. The two first elastic members 691 substantially form a ring shape, to provide a relatively uniform elastic force to the base 61 and the support base 63. The first elastic member 691 and the second elastic member 693 are spaced apart in the direction of a first central axis of the base 61. The two second elastic members 693 substantially form a ring shape, to provide a relatively uniform elastic force to the base 61 and the support base 63.

The second elastic member 693 also serves as a common ground (common) of the motor 60. In other words, the second elastic member 693 replaces the common ground for electrical conduction in the original eight-wire motor, so as to provide for an electrical connection while the first central axis of the base 61 substantially coincides with a second central axis of the support base 63, which is beneficial to simplification of the structure and wiring of the motor 60. It can be understood that the first elastic member 691 may be omitted, the quantity and shape of the first elastic members 691 are not limited, and the quantity and shape of the second elastic members 691 are not limited.

The first elastic member 691 (upper elastic sheet) and the second elastic member 693 (lower elastic sheet) are added to the motor 60, and the second elastic member 693 is used to replace the common ground. The first elastic member 691 and the second elastic member 693 can provide an elastic force for the support base 63 (rotor) of the motor 60 to keep the support base 63 in the centered state, which greatly resolves the problem of eccentricity.

Fifth Implementation

Figure 19:
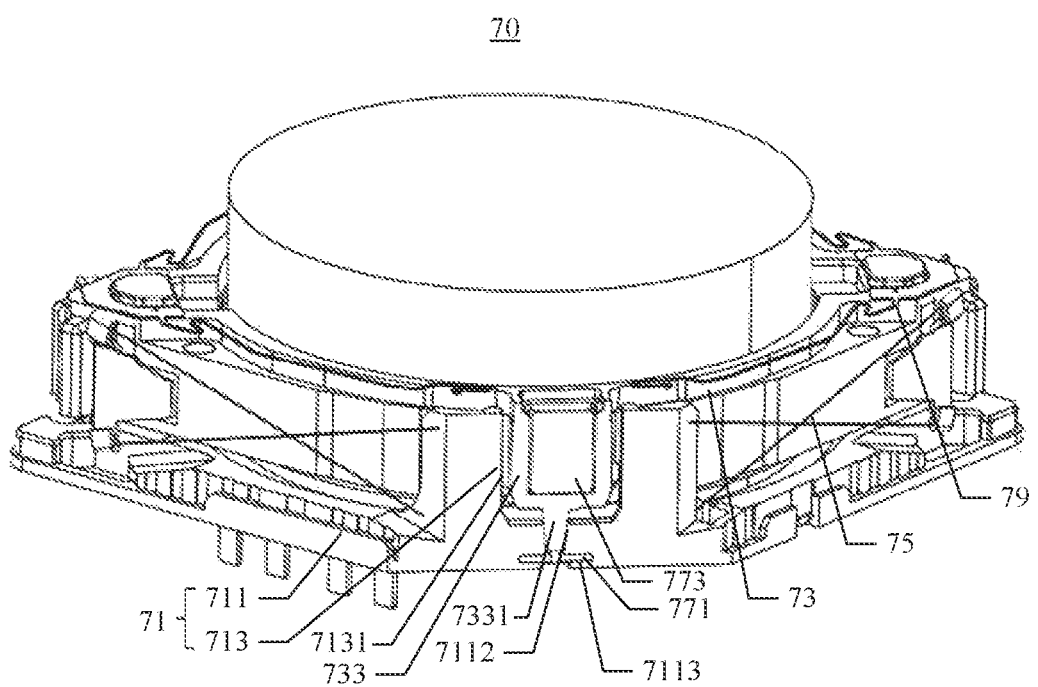
FIG. 19 is a perspective sectional view of a motor according to a fifth implementation of this application.

FIG. 19 is a perspective sectional view of a motor according to a fifth implementation of this application. The structure of the motor 70 provided in the fifth embodiment is substantially the same as that of the motor 20 provided in the first implementation, except that a baseplate 711 of a base 71 is provided with a guide groove 7112 communicating with a limiting groove 7131. A first accommodating hole 7113 is provided in a side wall of the guide groove 7112. A first eccentricity-prevention member 771 is accommodated in the first accommodating hole 7113. A guide protrusion 7331 is provided on the bottom of a second limiting portion 733 of a support base 73 facing the baseplate 711. The guide protrusion 7331 can be accommodated in the guide groove 7112. In this implementation, the guide protrusion 7331 is substantially V-shaped, which makes it easier for the guide protrusion 7331 to enter the guide groove 7112, and improves the accuracy of centering the support base 73. It can be understood that the shape of the guide groove 7112 is not limited.

When the motor 70 is in a powered-off state, due to the action of magnetostatic forces of attraction between the first eccentricity-prevention member 771 and the second eccentricity-prevention member 773 and an elastic force of the eccentricity-prevention elastic structure 79, the guide protrusion 7331 is accommodated in the guide groove 7112, and a first central axis of the base 71 coincides with a second central axis of the support base 73. When the motor 70 is in a powered-on state, due to the driving action of a shape memory alloy actuator 75, the guide protrusion 7331 is separated from the guide groove 7112, and the support base 73 is suspended above the base 71 for autofocus and image stabilization.

Sixth Implementation

Figure 20:
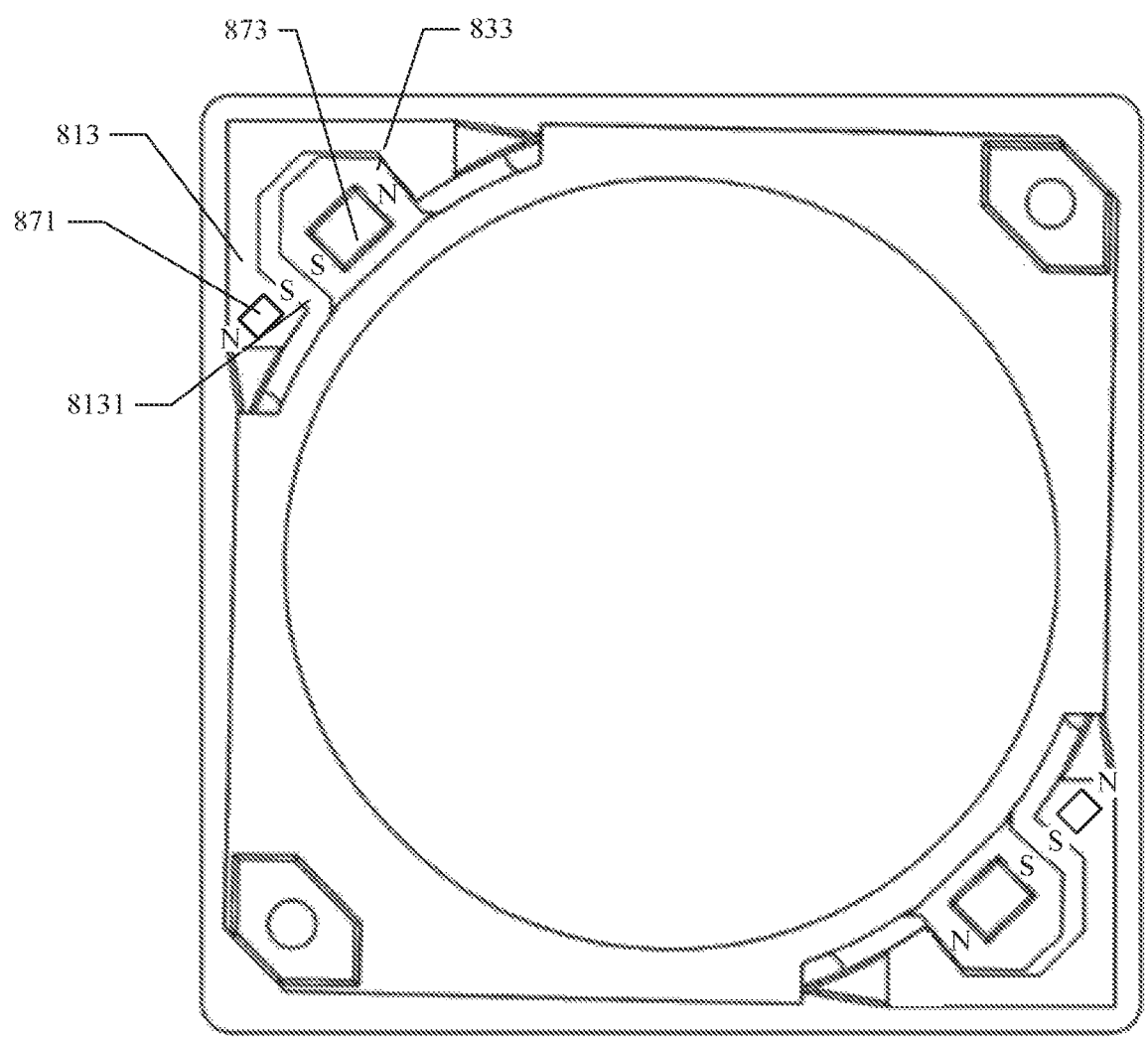
FIG. 20 is a top view of a motor in a powered-off state according to a sixth implementation of this application.

FIG. 20 is a top view of a motor in a powered-off state according to a sixth implementation of this application. The structure of the motor 80 provided in the sixth implementation is substantially the same as that of the motor 50 provided in the third implementation, except that a first magnetic pole (for example, the S pole shown in FIG. 20) of a first eccentricity-prevention member 871 and a first magnetic pole (for example, the S pole shown in FIG. 20) of a second eccentricity-prevention member 873 are disposed adjacent to each other, that is, the first eccentricity-prevention member 871 and the second eccentricity-prevention member 873 have magnetostatic forces of repulsion therebetween.

When the motor 80 is in a powered-off state, a support base 83 and a base 81 are subject to the action of the magnetostatic forces of repulsion between the first eccentricity-prevention member 871 and the second eccentricity-prevention member 873, and part of an outer side wall of a second limiting portion 833 and part of an inner side wall of a limiting groove 8131 of the base 81 are in close contact (in side-by-side close contact).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motor comprising:
   a base comprising:
      a first limiting portion comprising a limiting groove; and
      a baseplate from which the first limiting portion protrudes, wherein the baseplate comprises a first accommodating hole;
   a support base comprising:
      a second limiting portion; and
      a connecting portion spaced apart from the second limiting portion;
   an eccentricity-prevention elastic structure connected between the connecting portion and the first limiting portion, wherein the connecting portion comprises an abutting bump, and wherein the eccentricity-prevention elastic structure comprises a slot in which the abutting bump is accommodated;
   a shape memory alloy actuator connected between the first limiting portion and the connecting portion and configured to drive the support base to move relative to the base; and
   an eccentricity-prevention magnetic assembly comprising:

a first eccentricity-prevention member accommodated in the first accommodating hole; and a second eccentricity-prevention member disposed on the second limiting portion, wherein the second limiting portion comprises a second accommodating hole in which the second eccentricity-prevention member is accommodated, and wherein the second limiting portion is accommodated in the limiting groove, wherein, when the motor is in a powered-off state, a first central axis of the base is coincident with a second central axis of the support base under an action of magnetostatic forces between the first eccentricity-prevention member and the second eccentricity-prevention member.

2. The motor according to claim 1, wherein the first eccentricity-prevention member and the second eccentricity-prevention member have magnetostatic forces of attraction therebetween, and wherein, when the motor is the powered-off state, a side of the second limiting portion facing the baseplate fits together with the baseplate.

3. The motor according to claim 2, wherein the baseplate comprises a guide groove configured in accordance with the limiting groove, and wherein a bottom of the second limiting portion that is adjacent to the baseplate comprises a guide protrusion that is accommodated in the guide groove when the motor is in the powered-off state.

4. The motor according to claim 1, wherein the limiting groove extends through the baseplate and an end face of the first limiting portion away from the baseplate comprises the first accommodating hole.

5. The motor according to claim 4, wherein the first eccentricity-prevention member is accommodated in the first accommodating hole and the second eccentricity-prevention member is disposed on the second limiting portion, and wherein, when the motor is in the powered-off state, a part of an outer side wall of the second limiting portion fits together with a side wall of the limiting groove.

6. A mobile terminal comprising:
a camera module, comprising:
a lens; and
a motor, comprising:
a base, wherein the base comprises:
a first limiting portion comprising a limiting groove; and
a baseplate from which the first limiting portion protrudes, wherein the baseplate comprises a first accommodating hole;
a support base, wherein the support base comprises:
a second limiting portion; and
a connecting portion spaced apart from the second limiting portion, wherein the lens is fastened onto the support base;
an eccentricity-prevention elastic structure connected between the connecting portion and the first limiting portion, wherein the connecting portion comprises an abutting bump, and wherein the eccentricity-prevention elastic structure comprises a slot in which the abutting bump is accommodated;
a shape memory alloy actuator connected between the first limiting portion and the first limiting portion and configured to drive the support base to move relative to the base; and
an eccentricity-prevention magnetic assembly comprising:

a first eccentricity-prevention member accommodated in the first accommodating hole; and a second eccentricity-prevention member disposed on the second limiting portion, wherein the second limiting portion comprises a second accommodating hole in which the second eccentricity-prevention member is accommodated, and wherein the second limiting portion is accommodated in the limiting groove, wherein, when the motor is in a powered-off state, a first central axis of the base is coincident with a second central axis of the support base under an action of magnetostatic forces between the first eccentricity-prevention member and the second eccentricity-prevention member; and one or more processors configured to control and supply power to the shape memory alloy actuator to drive the support base with the lens to move relative to the base for autofocus and image stabilization.

7. The mobile terminal according to claim 6, wherein the first eccentricity-prevention member and the second eccentricity-prevention member have magnetostatic forces of attraction therebetween, and wherein, when the motor is in the powered-off state, a side of the second limiting portion facing the baseplate fits together with the baseplate.

8. The mobile terminal according to claim 7, wherein the baseplate comprises a guide groove configured in accordance with the limiting groove, and wherein a bottom of the second limiting portion that is adjacent to the baseplate comprises a guide protrusion that is accommodated in the guide groove when the motor is in the powered-off state.

9. The mobile terminal according to claim 6, wherein the limiting groove extends through the baseplate and an end face of the first limiting portion away from the baseplate comprises the first accommodating hole, wherein, when the motor is in the powered-off state, part of an outer side wall of the second limiting portion fits together with a side wall of the limiting groove.

10. The mobile terminal according to claim 6, wherein the eccentricity-prevention elastic structure comprises a first elastic member and a second elastic member that are each connected between the base and the support base and are spaced apart along the first central axis of the base.

11. The mobile terminal according to claim 6, wherein the eccentricity-prevention elastic structure is electrically connected to the shape memory alloy actuator as a common ground of the motor.

12. The mobile terminal according to claim 6, further comprising:
a speaker electrically connected to the one or more processors; and
a display electrically connected to the one or more processors.

13. The mobile terminal according to claim 6, wherein the mobile terminal is a smartphone or a smart watch.

14. The mobile terminal according to claim 6, wherein the mobile terminal is a tablet computer.

15. The mobile terminal according to claim 6, wherein the mobile terminal is a personal digital assistant (PDA).

16. The mobile terminal according to claim 6, wherein the mobile terminal is a notebook computer.

17. A motor comprising:
a base comprising:
a first limiting portion; and
a baseplate from which the first limiting portion protrudes, wherein the baseplate comprises a first accommodating hole;

a support base comprising:
- a second limiting portion corresponding to the first accommodating hole; and
- a connecting portion spaced apart from the second limiting portion;

an eccentricity-prevention elastic structure connected between the support base and the base, wherein the eccentricity-prevention elastic structure is connected between the connecting portion and the first limiting portion;

a shape memory alloy actuator connected between the base and the support base and configured to drive the support base to move relative to the base, wherein the shape memory alloy actuator is connected between the first limiting portion and the connecting portion; and an eccentricity-prevention magnetic assembly comprising:
- a first eccentricity-prevention member disposed on the base, wherein the first eccentricity-prevention member is accommodated in the first accommodating hole; and
- a second eccentricity-prevention member disposed on the support base, wherein the second limiting portion comprises a second accommodating hole in which the second eccentricity-prevention member is accommodated, wherein, when the motor is in a powered-off state, a first central axis of the base is coincident with a second central axis of the support base under an action of magnetostatic forces between the first eccentricity-prevention member and the second eccentricity-prevention member.

18. The motor according to claim 17, wherein the connecting portion comprises an abutting bump, and wherein the eccentricity-prevention elastic structure comprises a slot in which the abutting bump is accommodated.

19. The motor according to claim 17, wherein the eccentricity-prevention elastic structure comprises a first elastic member and a second elastic member that are each connected between the base and the support base and are spaced apart along the first central axis of the base.

20. The motor according to claim 17, wherein the eccentricity-prevention elastic structure is electrically connected to the shape memory alloy actuator as a common ground of the motor.

* * * * *